(12) United States Patent
Liu et al.

(10) Patent No.: US 11,356,206 B2
(45) Date of Patent: Jun. 7, 2022

(54) DATA TRANSMISSION AND MEASUREMENT TECHNIQUES

(71) Applicant: ZTE Corporation, Guangdong (CN)

(72) Inventors: Zhuang Liu, Guangdong (CN); Yin Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/239,129

(22) Filed: Apr. 23, 2021

(65) Prior Publication Data

US 2021/0242971 A1 Aug. 5, 2021

Related U.S. Application Data

(63) Continuation of application No. PCT/CN2018/113619, filed on Nov. 2, 2018.

(51) Int. Cl.
*H04L 1/16* (2006.01)
*H04L 1/18* (2006.01)

(52) U.S. Cl.
CPC ............ *H04L 1/1621* (2013.01); *H04L 1/18* (2013.01)

(58) Field of Classification Search
CPC ....... H04L 1/1621; H04L 1/18; H04L 1/1864; H04L 1/1671; H04W 28/04
See application file for complete search history.

(56) References Cited

U.S. PATENT DOCUMENTS

| | | | | |
|---|---|---|---|---|
| 7,327,734 B2* | 2/2008 | Yi | ........................ | H04W 36/10 370/350 |
| 9,538,411 B2* | 1/2017 | Park | ..................... | H04W 24/10 |
| 10,798,624 B2* | 10/2020 | Byun | .................... | H04W 36/08 |
| 2010/0158044 A1* | 6/2010 | Ray | ..................... | H04W 28/065 370/469 |
| 2019/0150224 A1* | 5/2019 | Han | .................... | H04W 88/085 370/329 |
| 2019/0229864 A1* | 7/2019 | Kim | ................. | H04W 72/0426 |
| 2019/0246310 A1* | 8/2019 | Han | ................. | H04W 28/0263 |

(Continued)

FOREIGN PATENT DOCUMENTS

CN 107277853 A 10/2017

OTHER PUBLICATIONS

International Search Report and Written Opinion in International Application No. PCT/CN2018/113619, dated Jun. 28, 2019, 6 pages.

(Continued)

*Primary Examiner* — Ivan O Latorre
(74) *Attorney, Agent, or Firm* — Perkins Coie LLP

(57) ABSTRACT

Methods, systems, and devices related to related to digital wireless communication, and more specifically, to techniques related to transmitting data and feedback data between network elements is disclosed. In one exemplary aspect, a method for wireless communication includes transmitting data from a first network element to a second network element. The method also includes receiving, at the first network element, feedback data from the second network element, where the feedback data includes a highest delivered packet data convergence protocol (PDCP) sequence number (SN) and information indicative of a range of data that has been successfully delivered to a terminal. The method also includes retransmitting at least a portion of the data from the first network element based on the feedback data.

12 Claims, 9 Drawing Sheets

(56) References Cited

U.S. PATENT DOCUMENTS

| | | | |
|---|---|---|---|
| 2019/0280826 A1* | 9/2019 | Yi | H04L 1/18 |
| 2019/0387432 A1* | 12/2019 | Kwak | H04W 28/06 |
| 2020/0359356 A1* | 11/2020 | Sirotkin | H04W 28/10 |
| 2021/0144585 A1* | 5/2021 | Toeda | H04L 47/34 |
| 2021/0185569 A1* | 6/2021 | Hu | H04L 5/0058 |
| 2021/0235291 A1* | 7/2021 | Byun | H04W 28/0236 |
| 2021/0314809 A1* | 10/2021 | Teyeb | H04W 76/12 |
| 2021/0385027 A1* | 12/2021 | Skarve | H04L 1/1874 |
| 2021/0392085 A1* | 12/2021 | Han | H04L 1/1642 |
| 2022/0030487 A1* | 1/2022 | Chen | H04W 36/08 |

OTHER PUBLICATIONS

Huawei et al. "R3-171814 Discussions on enhancement of retransmissions over F1 interface" NB3GPP TSG RAN WG3 Meeting #96, May 19, 2017 (May 19, 2017), 2 pages.

Qualcomm Incorporated, "R3-181330 Radio link outage feedback and out-of-order received PDUs" 3GPP TSG-RAN WG3 Meeting #99, Mar. 2, 2018 (Mar. 2, 2018), 5 pages.

Qualcomm Incorporated, "R3-180212 Corrections to NR UP protocol" 3GPP TSG-RAN WG3 Meeting #AH-1801, Jan. 26, 2018 (Jan. 26, 2018), 9 pages.

Qualcomm Incorporated, "R3-180609 Corrections to NR UP protocol" 3GPP TSG-RAN WG3 Meeting #AH-1801, Jan. 26, 2018 (Jan. 26, 2018), 4 pages.

Extended European Search Report for EP Application No. 18930345.6, dated Oct. 18, 2021, 9 pages.

NTT DOCOMO, Inc., "How to acquire status of re-transmitted packets," 3GPP TSG-RAN WG3 #98, R3-174846, Reno, Nevada, USA, Nov. 27-Dec. 1, 2017, 10 pages.

* cited by examiner

DATA TRANSMISSION AND MEASUREMENT TECHNIQUES

CROSS-REFERENCE TO RELATED APPLICATIONS

This application is a continuation of International Patent Application No. PCT/CN2018/113619, filed on Nov. 2, 2018, the contents of which are incorporated herein by reference in its entirety.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY OF PARTICULAR EMBODIMENTS

This document discloses methods, systems, and devices related to digital wireless communication, and more specifically, to techniques related to transmitting data and feedback data between network elements.

In one exemplary aspect, a method for wireless communication is disclosed. The method includes receiving, at a transmitting data from a first network element to a second network element; receiving, at the first network element, feedback data from the second network element, where the feedback data includes a highest delivered packet data convergence protocol (PDCP) sequence number (SN) and information indicative of a range of data that has been successfully delivered to a terminal; and retransmitting at least a portion of the data from the first network element based on the feedback data.

In some embodiments, the information indicative of the range of data that has been successfully delivered to the terminal includes a new radio user plane data (NR-U) SN.

In some embodiments, the information indicative of the range of data that has been successfully delivered to the terminal includes the PDCP SN encapsulated within a NR-U packet data unit (PDU) and associated with a NR-U SN, where the NR-U SN is less than or equal to the NR-U SN associated with the PDCP SN.

In some embodiments, the information indicative of the range of data that has been successfully delivered to the terminal includes a PDU NR-U SN list bit map or a PDCP PDU list bit map or one or more start and end of an PDU NR-U SN set or one or more start and end of an PDCP SN set indicating whether the data in the list bitmap or the set belongs to the feedback data to identify multiple PDCPs. In some embodiments, the feedback data is transmitted via a down link data feedback frame.

In some embodiments, the method includes transmitting the data including a NR-U PDU from the first network element to the second network element; and recording the NR-U PDU and a corresponding NR-U PDU SN with a PDCP PDU encapsulated within the NR-PDU SN.

In some embodiments, the method includes transmitting data including a NR-U PDU from the first network element to the second network element; and recording a NR-U PDU and a corresponding NR-U PDU SN with a PDCP encapsulated in the NR-U PDU. In some embodiments, the method includes delivering the data including PDCP from the first network element to the second network element based on the feedback data; and deleting the data corresponding with PDCP from memory of the first network element based on the feedback data.

In some embodiments, the method includes determining the data including PDCP transmitted from the first network element to the second network element was unsuccessfully delivered to the terminal; transmitting PDU data from the first network element to a third network element; and transmitting the PDU data from the third network element to the terminal.

In some embodiments, the first network element is a central unit (CU) of a base station, and the second network element is a dedicated unit (DU) of the base station.

In some embodiments, the CU and DU of the base station are connected via a F1 interface.

In some embodiments, the first network element is a first base station and the second network element is a second base station, where the first network element and second network element are connected via a Xn or X2 interface.

In some embodiments, the method includes determining whether all PDCP SN transmitted by the first network element are less than or equal to the highest delivered PDCP SN in the feedback data; and determining whether all NR-U SN transmitted by the first network element are less than or equal to the highest reported NR-U SN in the feedback data, where all transmitted data is successfully delivered to the terminal based on determining that all transmitted PDCP SN are less than or equal to the highest delivered PDCP SN and all transmitted NR-U SN are less than or equal to the highest reported NR-U SN.

In another exemplary aspect, a method for wireless communication is disclosed. The method includes receiving, at a second network element, data from a first network element; transmitting, at the second network element, feedback data to the first network element, where the feedback data includes a highest delivered packet data convergence protocol (PDCP) sequence number (SN) and information indicative of a range of data that has been successfully delivered to a terminal; and receiving at least a portion of data retransmitted from the first network element based on the feedback data.

In some embodiments, the information indicative of the range of data that has been successfully delivered to the terminal includes at least one new radio user plane data (NR-U) SN.

In some embodiments, the information indicative of the range of data that has been successfully delivered to the terminal includes the PDCP SN encapsulated within a NR-U packet data unit (PDU) associated with the NR-U SN, where the SN indicates that the NR-U SN is less than or equal to the NR-U SN associated with the PDCP SN.

In some embodiments, the information indicative of the range of data that has been successfully delivered to the terminal indicates a PDU NR-U SN list bit map or a PDCP PDU list bit map or one or more start and end of an PDU NR-U SN set or one or more start and end of an PDCP SN set indicating whether the data in the list bitmap or set belongs to the feedback data to identify multiple PDCPs.

In some embodiments, the feedback data is transmitted via a down link data feedback frame.

In some embodiments, the method including receiving NR-U PDU at the first network element from the second network element; and recording a NR-PDU and a corresponding NR-U PDU SN with a PDCP PDU encapsulated within the NR-PDU SN.

In some embodiments, the method including receiving NR-U PDU at the first network element from the second network element; and recording a NR-U PDU and a corresponding NR-U PDU SN with the PDCP encapsulated in the NR-U PDU.

In some embodiments, the method includes determining whether NR-U PDU transmitted from the first network element to the second network element is retransmission data; and transmitting the retransmission data from the second network element to the terminal based on determining that the NR-U PDU transmitted from the first network element to the second network element is retransmission data.

In some embodiments, the method includes receiving data at the second network element from the first network element, where the data includes at least two NR-U PDUs, and where each of the at least two NR-U PDUs include PDCP SN encapsulated in the NR-U PDU; reordering the NR-U PDUs based on PDCP SN sequence at the second network element; and transmitting the ordered NR-U PDUs to the terminal.

In some embodiments, the method includes determining whether all PDCP SN transmitted by the first network element are less than or equal to the highest delivered PDCP SN in the feedback data; and determining whether all NR-U SN transmitted by the first network element are less than or equal to the highest reported NR-U SN in the feedback data, where all transmitted data is successfully delivered to the terminal based on determining that all transmitted PDCP SN are less than or equal to the highest delivered PDCP SN and all transmitted NR-U SN are less than or equal to the highest reported NR-U SN.

In some embodiments, the method includes receiving data including PDCP from the first network element to the second network element based on the feedback data; and deleting the data corresponding with PDCP that is locally stored at the first network element based on the feedback data. In some embodiments, the method includes determining that the PDCP transmitted from the first network element to the second network element was unsuccessfully delivered to the terminal; transmitting the PDU data from a first network element to a third network element; and transmitting the PDU data from the third network element to the terminal.

In some embodiments, the first network element is a central unit (CU) of a base station, and the second network element is a dedicated unit (DU) of the base station.

In some embodiments, the CU and DU of the base station are connected via an F1 interface.

In some embodiments, the first network element is a first base station and the second network element is a second base station, where the first network element and second network element are connected via a Xn or X2 interface.

In some embodiments, including a second terminal connected to the first network element and a network element connected to a plurality of base stations.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

This patent document relates to wireless communications and, more particularly to providing downlink feedback information based on data transmitted between network elements (NEs) in a wireless communications network.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios. As NR emerges in the wireless domain, UEs will be capable of supporting both protocols at the same time.

Figure 1:
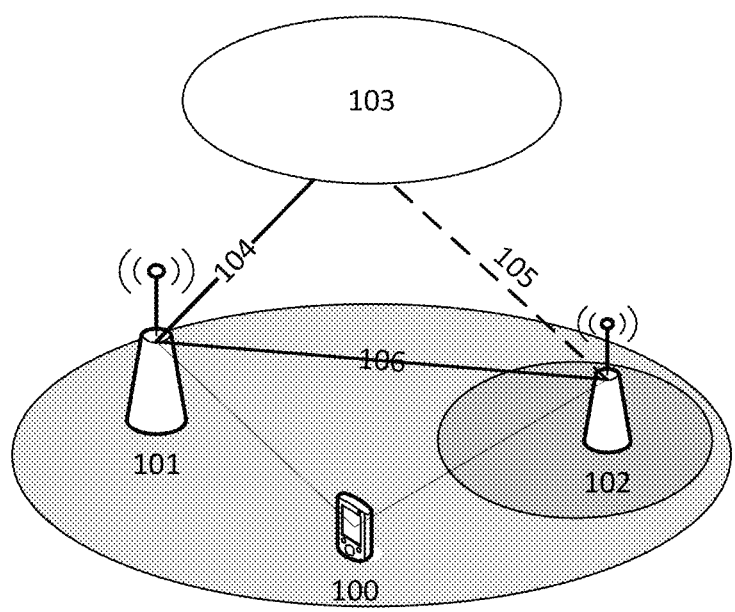
FIG. 1 shows an exemplary schematic diagram of a system architecture for Dual Connectivity (DC).

FIG. 1 shows an exemplary schematic diagram of a system architecture for Dual Connectivity (DC). The current base station (referred to as the first network element 101) in the core network 103 may select a suitable base station for the UE 100 to function as the second network element 102. For example, the suitable based station can be selected by comparing the channel quality of the base station with a predetermined threshold. Both base stations can provide radio resources to the UE 100 for data transmission on the user plane. On the wired interface side, the first network element 101 and the core network 103 establish a control plane interface 104 for the UE 100. The second network element 102 and the core network 103 may establish a user plane interface 105 for the UE 100.

An interface 106 (e.g., Xn interface) inter-connects the two network elements. The communication interface between 5G-capable network elements (gNB) may include an Xn interface. The interface between a 5G-capable network element (gNB) and a non-5G network element (e.g., eNB) may include an X2 interface. 5G supports the transfer of data between base stations via the Xn or X2 interfaces.

On the wireless interface side, the first and the second network elements (101 and 102) may provide radio resources using the same or different Radio Access Technologies (RATs). Each of the network element can schedule transmissions with the UE 100 independently. The network element that has a control plane connection to the core network is referred to as the master node (e.g., the first network element 101), and the network element that has only a user plane connection with the core network is referred to as the secondary node (e.g., the second network element 102). In some cases, the UE 100 can be connected to more than two nodes, with one node acting as the primary note and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are simultaneously connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN).

UE capabilities for the LTE protocol and the NR protocol in LTE-NR DC include two parts: common capabilities of the UE that are applicable to both LTE and NR protocols for single connectivity scenarios, and band combination capabilities of the UE that are relevant for dual connectivity scenarios. When the UE has multiple simultaneous connections with network nodes, the frequency bands used for different network nodes must cooperate with each other regardless of the RAT type(s) used. Here, the term "cooperate" means that the UE can operate in the frequency bands without any conflicts or substantial interference—that is, the frequency bands can co-exist. For example, the 3rd Generation Partnership Project (3GPP) Standards specify a set of band combinations that can cooperate with each other. If frequency band 1 and frequency band 2 are not specified as a valid band combination, the UE cannot use frequency band 1 in communication with node 1 and frequency band 2 in communication with node 2 and the same time.

A interface (Xn, X2) may include at least two planes: A control plane and a user plane. For example, the Xn/X2 control plane may be referred to as Xn-C/X2-C, and the user plane may be referred to as Xn-U/X2-U. The control plane (Xn-C/X2-C) may be used to transmit control plane information between base stations (gNB) and facilitate control plane functionality between base stations. The user plane (Xn-U/X2-U) may transmit user plane data and transmission status data between base stations (gNB).

In some embodiments, a 5G base station (gNB) supports central unit and dedicated unit separation architecture. Such a separation architecture may include a base station (gNB) with one centralized unit (gNB-CU) and one or more distributed units (gNB-DU). 5G supports internal base station data transmission between the gNB-CU and gNB-DU using an F1 interface.

The gNB-CU may control one or more gNB-DUs via an F1 interface. The F1 interface may be include a F1 Control plane (F1-C) and a F1 user plane (F1-U). F1-C may transmit control plane information to facilitate gNB-CU to gNB-DU control plane functionality. F1-U may transmit user plane data and transmission status feedback data.

Figure 2:
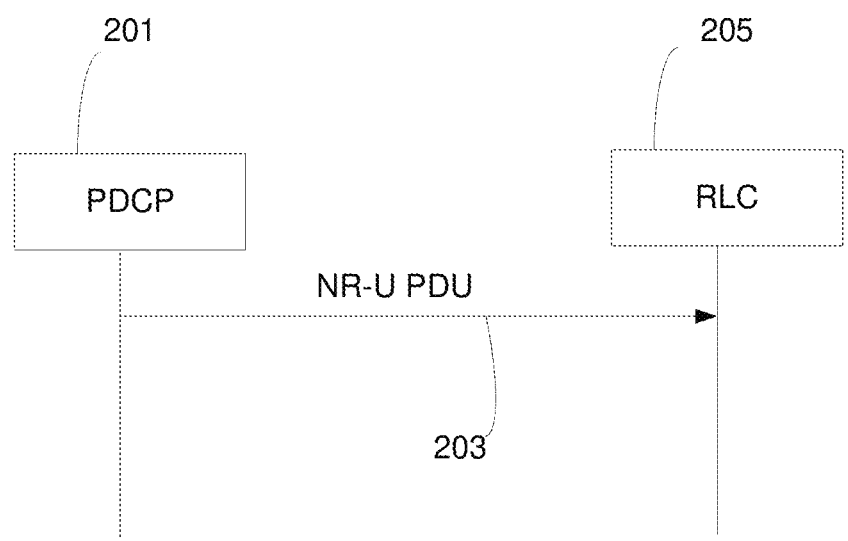
FIG. 2 shows an example of transmission of user plane data between network elements.

FIG. 2 shows an example of transmission of user plane data between network elements. In this example, a first network element 201 transmits a message 203 to a second network element 205. Examples of a network element may include a base station (eNB, gNB) or a unit within a base station (CU, DU). A network element may include packet data convergence protocol (PDCP), and in the embodiment as shown in FIG. 2, the first network element 201 may include PDCP. A network element may include radio link control (RLC), and in the embodiment as shown in FIG. 2, the second network element 205 may include RLC.

As shown in FIG. 2, the first network element (PDCP) 201 may transmit NR user plane data (NR-U) to the second network element (RLC) 205, where the NR-U data may be transmitted via one or more packet data units (PDUs). A NR-U PDU may be transmitted between network elements using the Xn-U, X2-U, or the F1-U interface.

In some embodiments, the first network element 201 is a gNB-CU and includes PDCP, and the second network element 205 is a gNB-DU that includes RLC. In these embodiments, the gNB-CU and gNB-DU may be connected via a F1 interface. In other embodiments, each network element is a base station (e.g., eNB, gNB), and the connection between base stations may include a X2/Xn interface.

On the user plane of an interface (F1-U, Xn-U, X2-U), the underlying data transport layer protocol may be based on GPRS Tunneling Protocol User Plane (GTP-U). The message 203 may include PDCP PDU using GTP-U. Each GTP-U user plane packet may include a GTP-U header and a tunnel PDU field (T-PDU field), where a GTP-U tunnel is used to transport an encapsulated T-PDU between GTP-U tunnel endpoints. A GTP-U packet may include a GTP-U header and T-PDU field.

In some embodiments, GTP-U may include an extended header structure. The IE defined by the interface PDU of the user plane may be carried by the extended header of the GTP-U. The transmitted GTP-U packet data may comprise NR-U PDU. One or more NR-U PDUs are sent on the NR-U interface. In some embodiments, a PDCP PDU may be encapsulated in an NR-U PDU.

A series of NR-U PDUs may be transmitted sequentially from the first network element and in a specific order. In some embodiments, each NR-U PDU includes a PDCP SN and a NR-U SN. Generally, the first network element 201 sends PDCP PDU data to the second network element 205, where each PDCP PDU is encapsulated in an NR-U PDU. A series of NR-U PDUs may be sent sequentially by an increasing PDCP SN sequence number. In some embodiments, a PDCP SN may be transmitted to the terminal sequentially, where each PDCP SN corresponds with a NR-U SN. A terminal (e.g., UE) may receive the NR-U PDUs in the sequential order, where the sequential order may include each PDCP PDU transmitted by increasing PDCP SN number.

Figure 3:
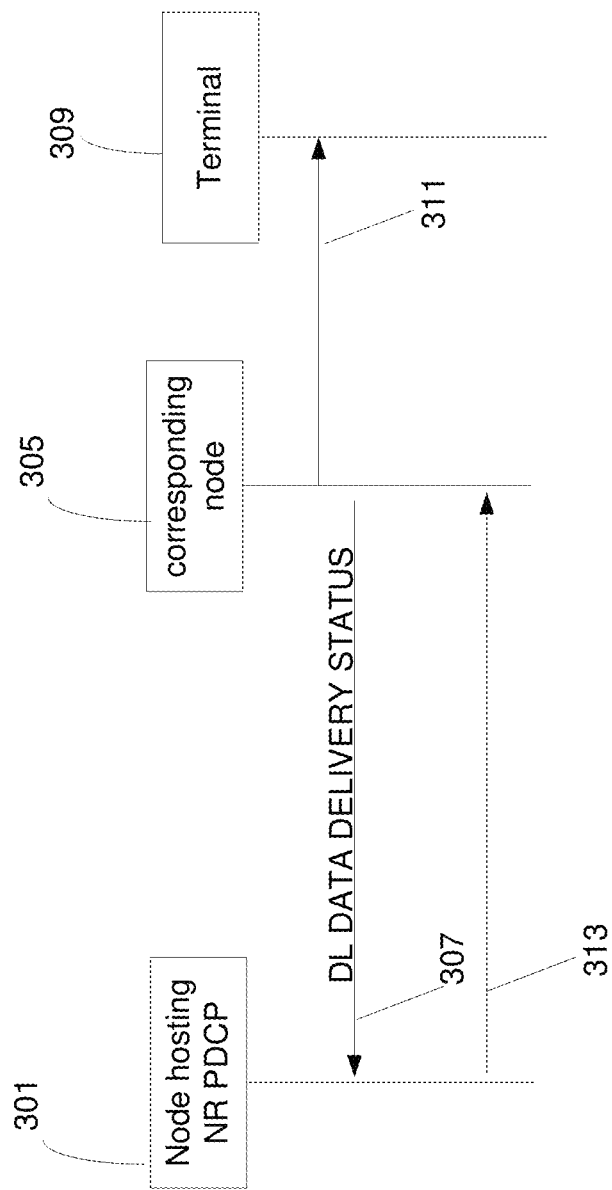
FIG. 3 shows an example of transmission of feedback data between network elements.

In some embodiments, the first network element may transmit NR-U PDU to the second network element 305 and record the NR-PDU and a corresponding NR-U PDU SN with a PDCP PDU encapsulated within the NR-PDU SN. Additionally, the first network element 301 may transmit NR-U PDU to the second network element and record the NR-PDU and a corresponding NR-U PDU SN with a PDCP encapsulated within the NR-U PDU FIG. 3 shows an example of transmission of feedback data between network elements. As illustrated in FIG. 3, a first network element 301 may include a node hosting NR PDCP, and the second network element 305 may host a corresponding node. The first network element 301 may transmit data to a second network element 305, such as a node where the RLC is located. The data may include NR-U PDU data, where each NR-U PDU may include a PDCP SN and an NR-U SN.

As shown in FIG. 3, the second network element 305 may transmit data to the terminal 309 via terminal message 311. In some embodiments, the terminal 309 may include a UE. All data transmitted to the terminal 309 via terminal message 311 and received by the terminal 309 may be referred to as successfully delivered data.

In some embodiments, the second network element 305 may transmit a feedback message 307 to the first network element 301. The feedback message 307 may be in the downlink (DL) data. The feedback message 307 may indicate the data transmission state to the first network element 301 in the downlink feedback frame (e.g. DL data delivery status). The first network element 301 may receive the downlink data in the downlink data feedback frame of the feedback message 307, where the feedback ratio is the highest delivered PDCP SN that indicates the maximum PDCP SN of the PDCP PDU that was successfully delivered to the terminal 309.

The DL data delivery status of the feedback message 307 may indicate whether some or all of the data was successfully delivered to the terminal 309. In some embodiments, the first network element 301 receives the feedback message 307 from the second network element 305, where the feedback message 307 indicates whether some or all of the PDCP data was successfully transmitted to the terminal 309. Successful transmission of a PDCP may include the PDCP transmitted by the first network element 301 successfully delivered to the terminal 309 via terminal message 311. In these embodiments, the data associated with the successfully delivered PDCP PDUs may be deleted from the memory (e.g., cache memory) of the first network element 301.

In some embodiments, the first network element 301 may receive data in the feedback message 307 that indicates at least some PDCP were not successfully transmitted. In these embodiments, the PDCP transmitted from the first network element 301 was not successfully delivered to the terminal 309.

In the event of unsuccessful delivery to the terminal 309, the first network element 301 may retransmit at least a portion of the PDCP PDU data to the second network element 305 in a retransmission message 313. Generally, the first network element 301 sends PDCP PDU data to the second network element 305, where each PDCP PDU is encapsulated in an NR-U PDU.

In the feedback message 307 to the first network element 301, the second network element 305 may transmit the greatest numbered PDCP SN that was successfully sent to the terminal. In other words, the greatest PDCP SN in a sequence of PDCP PDUs that was successfully delivered to the terminal 309 is transmitted in the feedback message 307. Generally, the highest delivered PDCP SN may indicate where the successful transmission of the data to the terminal 309 ends. Any PDCP PDU with a PDCP SN greater than the highest delivered PDCP SN may be out of order or undelivered to the terminal 309.

If the first network element 301 transmits PDCP with corresponding PDUs to the second network element 305 that are out of order, the data may not be transmitted in order over the interface (e.g., Xn, X2, F1). In the existing feedback method, indicating only one of the largest consecutively delivered PDCP SNs cannot respond to the delivery of the out of order data. Accordingly, existing network elements cannot determine what data was successfully transmitted to the terminal 309. In some embodiments, the first network element 301 may delete the PDU from its memory if the first network element 301 determines that the PDU was successfully delivered. Also, the first network element may 301 may determine that PDCP was not delivered successfully and the PDU must be retransmitted from via retransmission message 313 to deliver the PDU to the terminal 309.

This patent document describes techniques that can be implemented to provide feedback to a network element that includes both a highest delivered PDCP SN and information indicative of a range of data that has been successfully delivered to a terminal. The first network can identify any undelivered data and retransmit any data that was unsuccessfully delivered in a proper order based on both the highest delivered PDCP SN and information indicative of the range of data that has been successfully delivered to the terminal.

Figure 4:
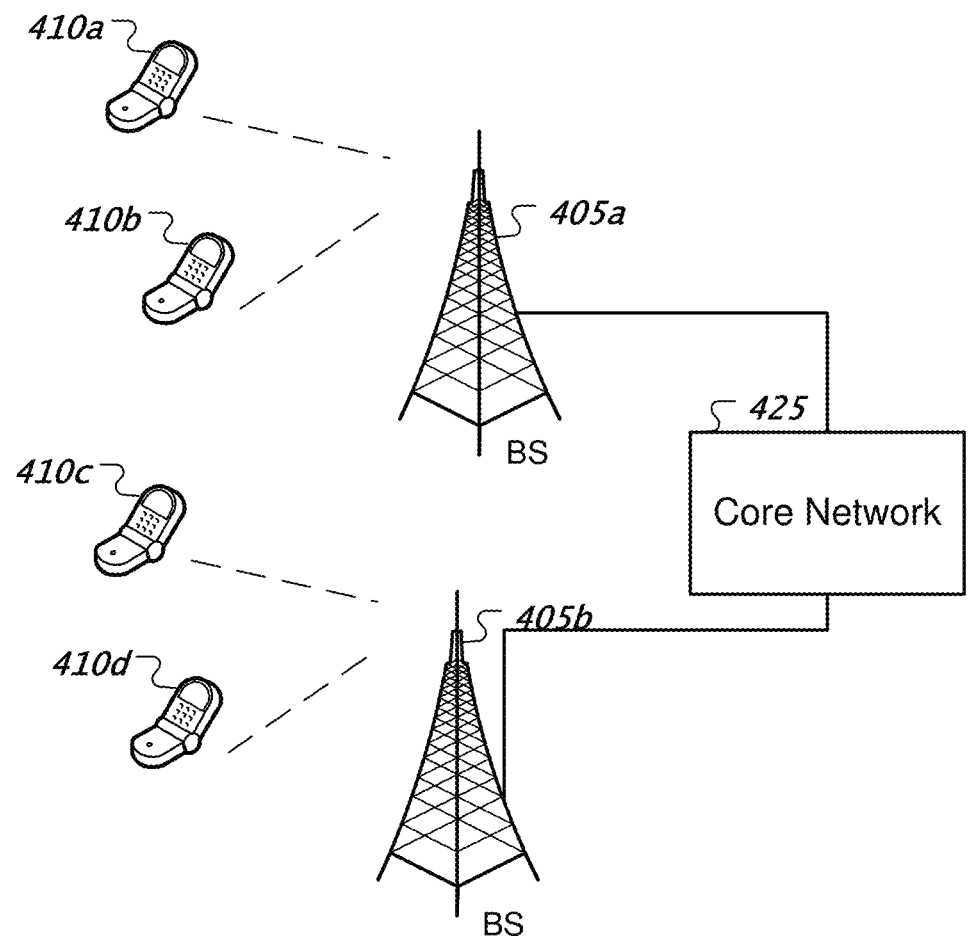
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405*a*, 405*b*, one or more wireless devices 410*a*, 410*b*, 410*c*, 410*d*, and a core network 425. A base station 405*a*, 405*b* can provide wireless service to wireless devices 410*a*, 410*b*, 410*c* and 410*d* in one or more wireless sectors. In some implementations, a base station 405*a*, 405*b* includes directional antennas to produce two or more directional beams to provide wireless coverage in different sectors.

The core network 425 can communicate with one or more base stations 405*a*, 405*b*. The core network 425 provides connectivity with other wireless communication systems and wired communication systems. The core network may include one or more service subscription databases to store information related to the subscribed wireless devices 410*a*, 410*b*, 410*c*, and 410*d*. A first base station 405*a* can provide wireless service based on a first radio access technology, whereas a second base station 405*b* can provide wireless service based on a second radio access technology. The base stations 405*a* and 405*b* may be co-located or may be separately installed in the field according to the deployment scenario. The wireless devices 410*a*, 410*b*, 410*c*, and 410*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
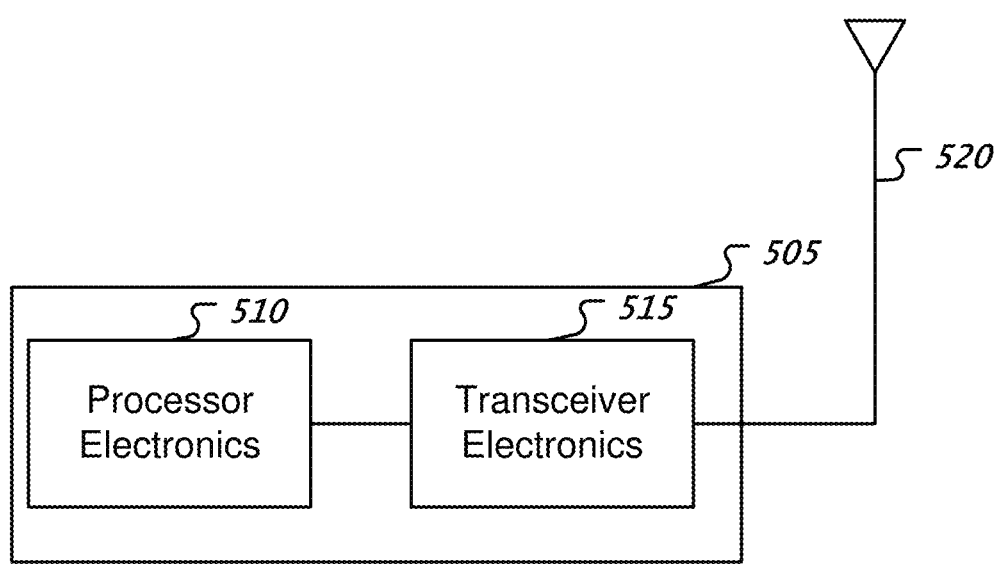
FIG. 5 is a block diagram representation of a portion of a radio station.

FIG. 5 is a block diagram representation of a portion of a radio station. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

Example Embodiment 1

Figure 6:
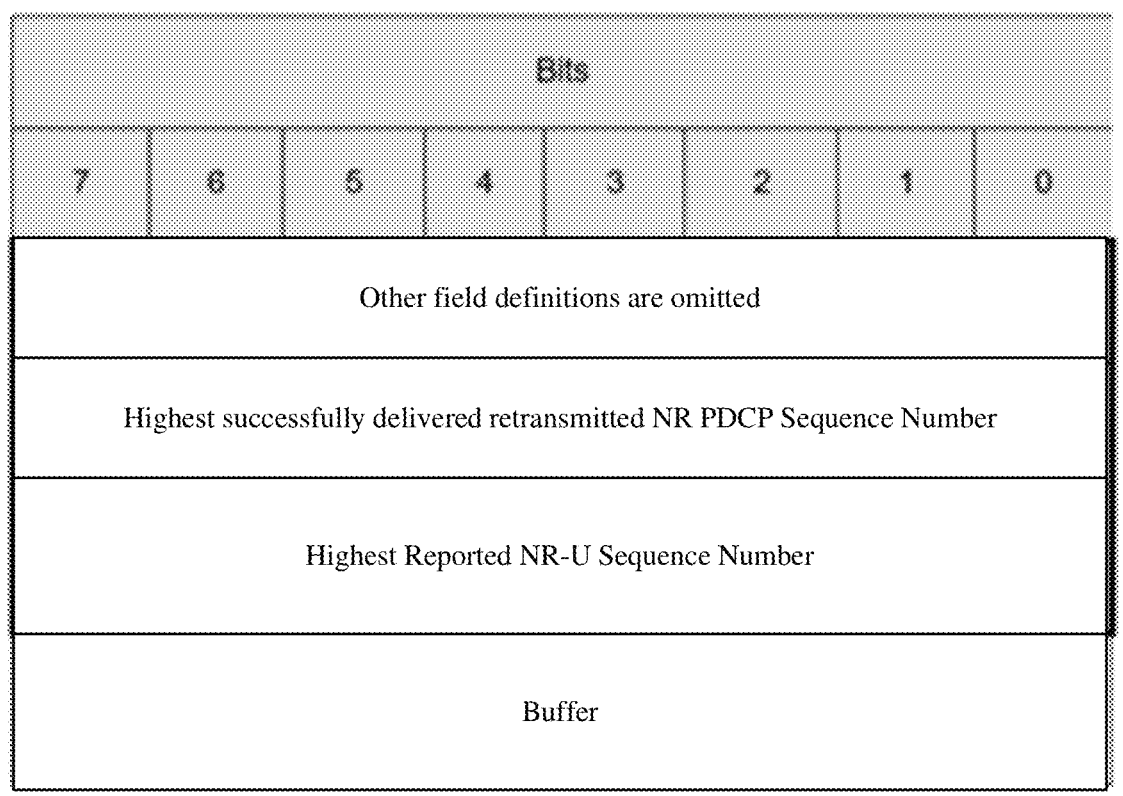
FIG. 6 shows an exemplary downlink data feedback frame for RLC acknowledged mode (AM).

FIG. 6 shows an exemplary downlink data feedback frame for RLC acknowledged mode (AM). In this embodiment, the downlink data feedback frame is for a RLC AM feedback message. The feedback message may be transmitted to the first network element, where the first network element may retransmit data based on the contents of the feedback message. In the downlink data feedback frame, only portions of data relating to the transmission state feedback are described. Other portions of the data may be omitted from the present disclosure.

RLC AM mode generally includes the terminal transmitting a message representing an acknowledgement that the terminal successfully received data. In RLC AM mode, when the feedback data is transmitted to the first network element, the highest successfully delivered retransmitted NR PDCP SN and information indicative of a range of data that has been successfully delivered to a terminal may be included in the feedback message.

The highest successfully delivered retransmitted NR PDCP SN may include retransmitted data from the first network element to deliver the maximum PDCP SN that was successfully delivered to the terminal. For example, the NR PDCP SN may indicate the highest SN that was successfully delivered among the retransmission data PDCP that was transmitted from the first network element to the second network element. The first network element may retransmit data in order to deliver the highest PDCP SN.

Information indicative of a range of data that has been successfully delivered to a terminal may include the highest reported NR-U SN that was successfully delivered to the terminal. The highest reported NR-U SN may be used to indicate the scope of the report for the retransmission of data. In some embodiments, the information indicative of a range of data that has been successfully delivered to a terminal may include PDCP SN encapsulated within a NR-U PDU associated with the NR-U SN, where the SN indicates that the NR-U SN is less than or equal to the NR-U SN associated with the PDCP SN. In some embodiments, the information indicative of the range of data that has been successfully delivered to the terminal includes a PDU NR-U SN list bit map or a PDCP PDU list bit map or one or more start and end of an PDU NR-U SN set or one or more start and end of an PDCP SN set indicating whether the data in the list bitmap or the set belongs to the feedback data to identify multiple PDCPs.

The highest successfully delivered retransmitted NR PDCP SN and information indicative of a range of data that has been successfully delivered to a terminal may indicate what data was successfully transmitted to the terminal. In an example, the first network element transmits data representing one or more PDCP PDUs to the second network element. The second network element transmits the data to the terminal, where the terminal acknowledged that the data was successfully delivered to the terminal.

Accordingly, in the feedback message, the second network element transmits the highest successfully delivered retransmitted NR PDCP SN and information indicative of a range of data that has been successfully delivered to the terminal to the first network element. The first network element may determine that the highest PDCP SN received was the greatest PDCP SN in the PDCP SN sequence that was transmitted. Similarly, the first network element may determine that the information indicative of a range of data that has been successfully delivered to the terminal (e.g., the highest reported NR-U SN) was the highest SN in a sequence of SNs that was transmitted.

The first network element may determine that all transmitted PDCP SNs are less than or equal to the highest reported PDCP SN to determine that all transmitted PDCP PDUs were successfully delivered to the terminal. Similarly, the first network element may determine that all NR-U SNs are less than or equal to the highest reported SN to determine that all transmitted PDCP PDUs were successfully delivered to the terminal. In this embodiment, the first network element may determine that all PDCP PDUs were successfully delivered to the terminal.

In some embodiments, the PDCP transmitted from the first network element to the second network element may be unsuccessfully delivered to the terminal. In these embodiments, the first network element may transmit the PDU data to a third network element, such as a base station. The third network element may then transmit the PDU data to the terminal.

In another example, in the feedback message, the second network element transmits the highest successfully delivered retransmitted NR PDCP SN and information indicative of a range of data that has been successfully delivered to the terminal to the first network element to the first network element. In an example, the first network element may determine that the highest PDCP SN received was not the greatest PDCP SN in the PDCP SN sequence that was transmitted. In this example, a PDCP SN corresponding to a PDCP PDU transmitted from the first network element may be greater than the highest delivered PDCP SN in the feedback message. The first network element may determine that some PDCP PDUs were unsuccessfully delivered, as a PDCP SN of a transmitted PDCP PDU is greater than the highest delivered PDCP SN in the feedback message. However, looking only at the highest delivered PDCP SN, it may be unclear what PDCP PDUs were unsuccessfully transmitted to the terminal.

Similarly, the first network element may determine that the information indicative of a range of data that has been successfully delivered to the terminal (e.g., the highest NR-U SN reported) was not the greatest NR-U SN in the sequence that was transmitted, as a transmitted NR-U SN is greater than the highest reported NR-U SN. In this example, the first network element may determine that at least some PDCP PDUs with a corresponding NR-U SN greater than the highest reported NR-U SN should be retransmitted. Determining what data to retransmit based on the highest delivered PDCP SN and information indicative of a range of data that has been successfully delivered to the terminal may allow for data to be retransmitted properly and in order.

Example Embodiment 2

Figure 7:
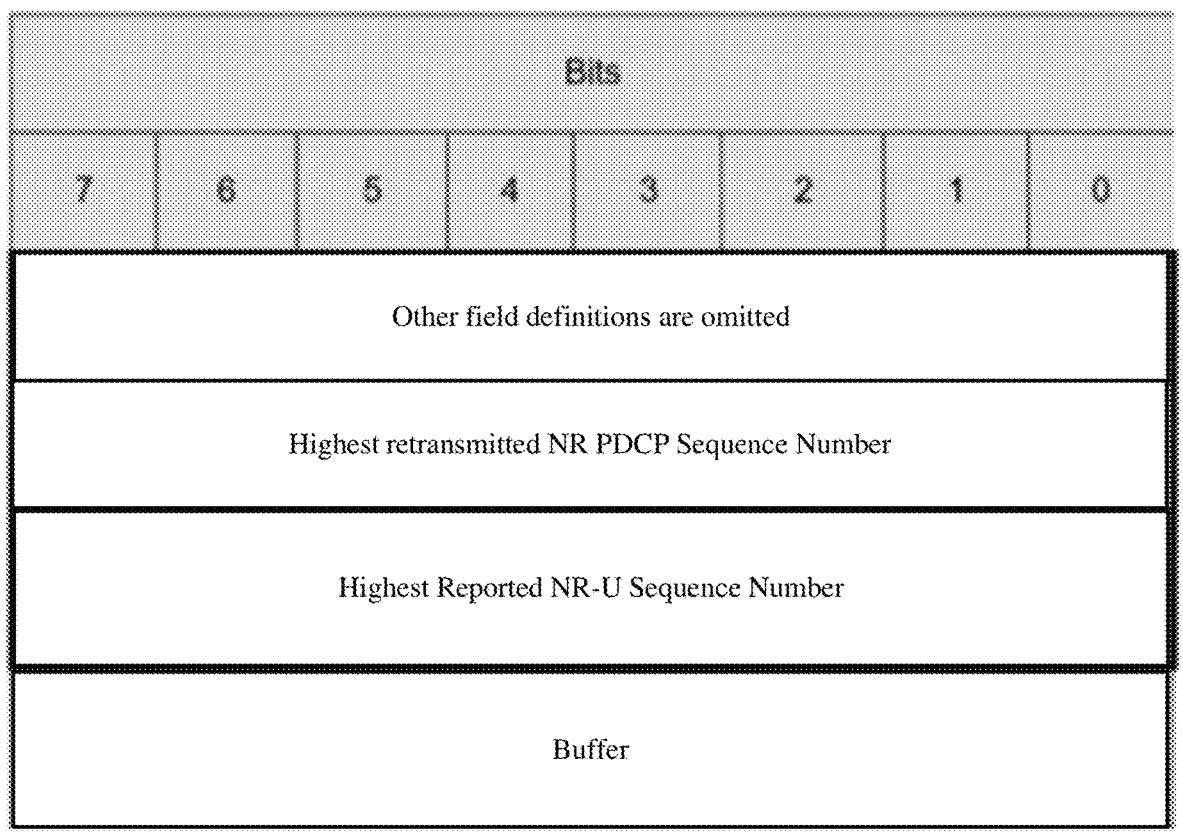
FIG. 7 shows an exemplary downlink data feedback frame for RLC unacknowledged mode (UM).

FIG. 7 shows an exemplary downlink data feedback frame for RLC unacknowledged mode (UM). In this embodiment, the downlink data feedback frame is for a RLC UM feedback message. In RLC unacknowledged mode, RLC UM is a non-confirmed delivery (i.e. the NE does not know whether the UM data is delivered to the terminal) mode, so the network element only feeds back whether the UM mode data is successfully delivered to the underlying MAC/PHY layer.

The feedback message as shown in FIG. 7 may be transmitted to the first network element, where the first network element may retransmit data based on the feedback message. In the downlink data feedback frame, only portions of data relating to the transmission state feedback are described. Other portions of the data may be omitted from the present disclosure.

When the feedback message is transmitted to the first network module, the feedback message may include the highest retransmitted NR PDCP SN and information indicative of a range of data that has been successfully delivered to the terminal (e.g., highest reported NR-U SN) to feedback whether the data is successfully delivered to the MAC/PHY layer. The information indicative of a range of data that has been successfully delivered to the terminal may include a highest reported NR PDCP SN, and the first network element may map the NR PDCP SN with a corresponding PDCP SN and NR-U SN.

In some embodiments, the first network element may determine whether the transmitted PDCP SNs are less than or equal to the highest reported PDCP SN. If all transmitted PDCP SNs are less than or equal to the highest reported PDCP SN, all PDCP PDUs were successfully delivered. If a transmitted PDCP SN is greater than the highest reported PDCP SN, at least a portion of the PDCP PDUs were not successfully delivered to the terminal.

Similarly, the first network element may determine whether the NR-U SNs of the transmitted data are less than or equal to the information indicative of a range of data that has been successfully delivered to the terminal (e.g., highest reported NR-U SN). If all transmitted NR-U SNs are less than or equal to the highest reported NR-U SN, all PDCP PDUs were successfully delivered. If a transmitted NR-U SN is greater than the highest reported NR-U SN, at least a portion of the PDCP PDUs were not successfully delivered to the terminal.

Example Embodiment 3

Figure 8:
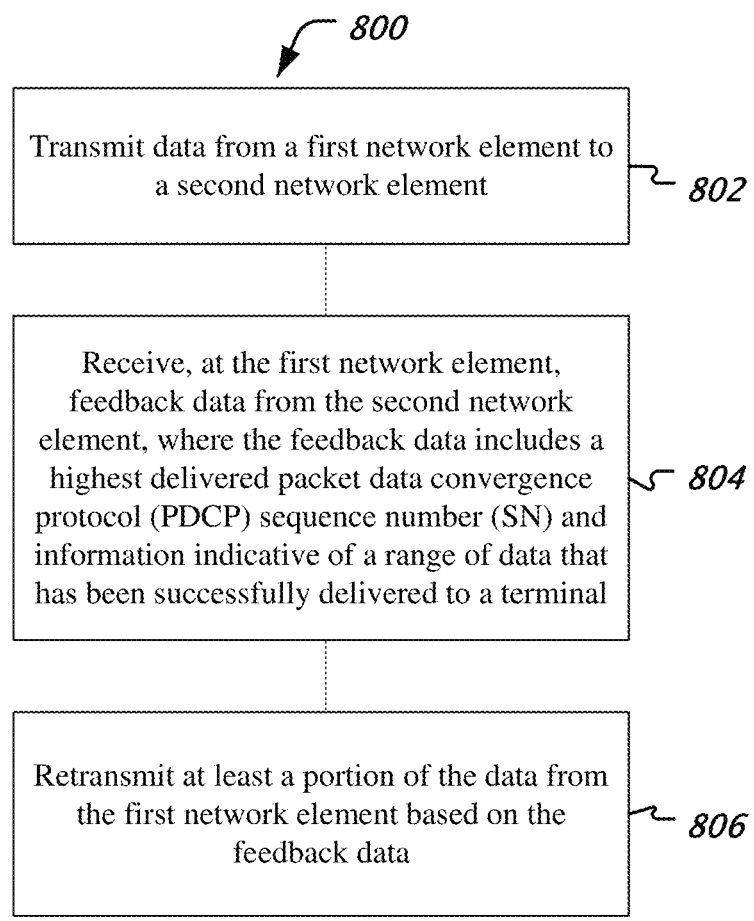
FIG. 8 shows a flow chart representation of a method for wireless communication.

FIG. 8 shows a flow chart representation of a method 800 for wireless communication. The method 800 includes, at 802, transmitting data from a first network element to a second network element. The method 800 also includes, at 804, receiving, at the first network element, feedback data from the second network element, where the feedback data includes a highest delivered packet data convergence protocol (PDCP) sequence number (SN) and information indicative of a range of data that has been successfully delivered to a terminal. The method 800 also includes, at 806, retransmitting at least a portion of the data from the first network element based on the feedback data.

In some embodiments, the method 800 may include performing data deletion from memory of the first network element and data retransmission according to the feedback message. The first network element may receive the retransmission data transmission status in the feedback message, and the data that was successfully transmitted may be deleted from the first network element. Data that was not successfully delivered, as indicated in the feedback message, is retransmitted, thereby deleting the memory of the first network element and ensuring reliability of the data transmission.

Example Embodiment 4

Figure 9:
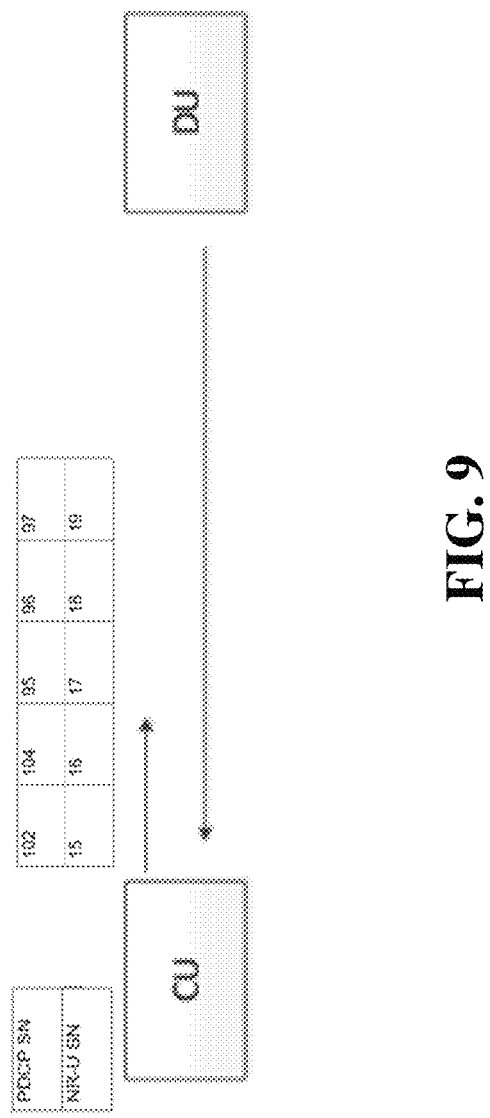
FIG. 9 shows an exemplary process of transmitting a feedback message between network elements.

FIG. 9 shows an exemplary process of transmitting a feedback message between network elements. As shown in FIG. 9, data is transmitted from a first network element to a second network element. In some embodiments, the first network element is a CU of a base station, and the second network element is a DU of the base station.

In some embodiments, the data includes one or more PDCP PDUs. As shown in FIG. 9, the CU may transmit PDCP PDUs in the following order: #102(15), #104(16), #95(17), #96(18), #97(19), where each PDU is represented by # PDCP SN (NR-U SN). For example, #102(15) has a PDCP SN of 102 and a NR-U SN of 15.

Generally, data transmitted to the terminal is ordered sequentially by PDCP SN. In this example, however, the data transmitted is out of order, as PDCP SN #104 was transmitted ahead of PDCP SN #95, #96, and #97. The data may be transmitted out of order for a variety of reasons, such as interface delay or interference, for example. In this embodiment, if the data is received out of order, the terminal may only successfully receive #102(15), #104(16), and the terminal may fail to successfully receive #95(17), #96(18), #97(19). The second network element may reorder any out of order data. In some embodiments, the second network element may reorder PDCP PDUs by consecutive PDCP SN numbers, where the PDU with the lowest received PDCP SN is ordered first, and the PDU with the greatest received PDCP SN is ordered last. In other embodiments, the PDUs may be ordered by NR-U SN. The second network element may transmit the ordered PDUs in a terminal message to the terminal.

The second network element may transmit a feedback message to the first network element based on the data successfully delivered to the terminal, where the feedback message includes the highest delivered PDCP SN and information indicative of a range of data delivered to the terminal. In this embodiment, the highest delivered PDCP SN is 104, the greatest PDCP SN number successfully delivered to the terminal. Additionally, in this embodiment, the information indicative of a range of data delivered to the terminal, the highest reported NR-U SN, is 16.

Upon receipt of the feedback message, the first network element may determine that the highest delivered PDCP SN was 104 and the highest reported NR-U SN was 16. The first network element may determine that all PDCP SNs transmitted were less than or equal to 104. In conventional systems, viewing the highest PDCP SN alone may leave confusion as to whether all PDCP PDUs were successfully delivered to the terminal.

In some embodiments, the first network element may determine whether all transmitted NR-U SN were less than or equal to the highest reported NR-U SN (16). However, in this example, the transmitted NR-U SNs include numbers ranging from 17 to 19. The first network element may determine that the transmitted NR-U SNs (17 to 19) are greater than the highest reported NR-U SN (16), and accordingly, the first network element may determine that #95(17), #96(18), #97(19) failed to successfully deliver to the terminal.

In response to the above determinations, the first network element may retransmit all or part of the data to the second network element. If the second network element transmits a feedback message to the first network element including a highest delivered PDCP SN and highest reported NR-U SN, the first network element may determine that the transmitted data includes PDCP SNs and NR-U SNs less than or equal to the highest delivered PDCP SN and highest reported NR-U SN. The first network element may then determine that all data was successfully delivered to the terminal.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
    transmitting data from a first network element to a second network element;
    receiving, at the first network element, feedback data from the second network element, where the feedback data includes a highest delivered packet data convergence protocol (PDCP) sequence number (SN) and information indicative of a range of data that has been successfully delivered to a terminal; and
    retransmitting at least a portion of the data from the first network element based on the feedback data,
        where the information indicative of the range of data that has been successfully delivered to the terminal includes a highest reported new radio user plane data (NR-U) SN successfully delivered to the terminal;
    determining whether all PDCP SN transmitted by the first network element are less than or equal to the highest delivered PDCP SN in the feedback data; and
    determining whether all NR-U SN transmitted by the first network element are less than or equal to the highest reported NR-U SN in the feedback data, where all transmitted data is successfully delivered to the terminal based on determining that all transmitted PDCP SN are less than or equal to the highest delivered PDCP SN and all transmitted NR-U SN are less than or equal to the highest reported NR-U SN.

2. The method of claim 1, where the information indicative of the range of data that has been successfully delivered to the terminal includes a PDCP SN encapsulated within a NR-U packet data unit (PDU) and associated with a NR-U SN, where the highest reported NR-U SN is less than or equal to the NR-U SN associated with the PDCP SN.

3. The method of claim 1, where the information indicative of the range of data that has been successfully delivered to the terminal includes start and end of an PDU NR-U SN set indicating whether the data in the set belongs to the feedback data to identify multiple PDCPs.

4. A method for wireless communication, comprising:
receiving, at a second network element, data from a first network element;
transmitting, at the second network element, feedback data to the first network element, where the feedback data includes a highest delivered packet data convergence protocol (PDCP) sequence number (SN) and information indicative of a range of data that has been successfully delivered to a terminal; and
receiving at least a portion of data retransmitted from the first network element based on the feedback data,
where the information indicative of the range of data that has been successfully delivered to the terminal includes at least one highest reported new radio user plane data (NR-U) SN successfully delivered to the terminal;
determining whether all PDCP SN transmitted by the first network element are less than or equal to the highest delivered PDCP SN in the feedback data; and
determining whether all NR-U SN transmitted by the first network element are less than or equal to the highest reported NR-U SN in the feedback data, where all transmitted data is successfully delivered to the terminal based on determining that all transmitted PDCP SN are less than or equal to the highest delivered PDCP SN and all transmitted NR-U SN are less than or equal to the highest reported NR-U SN.

5. The method of claim 4, where the information indicative of the range of data that has been successfully delivered to the terminal includes a PDCP SN encapsulated within a NR-U packet data unit (PDU) associated with the NR-U SN, where the highest reported NR-U SN is less than or equal to the NR-U SN associated with the PDCP SN.

6. The method of claim 4, where the information indicative of the range of data that has been successfully delivered to the terminal indicates start and end of an PDU NR-U SN set indicating whether the data in the set belongs to the feedback data to identify multiple PDCPs.

7. An apparatus for wireless communication comprising a processor that is configured to perform a method, the processor being configured to:
transmit data from a first network element to a second network element;
receive, at the first network element, feedback data from the second network element, where the feedback data includes a highest delivered packet data convergence protocol (PDCP) sequence number (SN) and information indicative of a range of data that has been successfully delivered to a terminal; and
retransmit at least a portion of the data from the first network element based on the feedback data,
where the information indicative of the range of data that has been successfully delivered to the terminal includes a highest reported new radio user plane data (NR-U) SN successfully delivered to the terminal;
determine whether all PDCP SN transmitted by the first network element are less than or equal to the highest delivered PDCP SN in the feedback data; and
determine whether all NR-U SN transmitted by the first network element are less than or equal to the highest reported NR-U SN in the feedback data, where all transmitted data is successfully delivered to the terminal based on a determination that all transmitted PDCP SN are less than or equal to the highest delivered PDCP SN and all transmitted NR-U SN are less than or equal to the highest reported NR-U SN.

8. The apparatus of claim 7, where the information indicative of the range of data that has been successfully delivered to the terminal includes a PDCP SN encapsulated within a NR-U packet data unit (PDU) and associated with a NR-U SN, where the highest reported NR-U SN is less than or equal to the NR-U SN associated with the PDCP SN.

9. The apparatus of claim 7, where the information indicative of the range of data that has been successfully delivered to the terminal includes start and end of an PDU NR-U SN set indicating whether the data in the set belongs to the feedback data to identify multiple PDCPs.

10. An apparatus for wireless communication comprising a processor that is configured to perform a method, the processor being configured to:
receive, at a second network element, data from a first network element;
transmit, at the second network element, feedback data to the first network element, where the feedback data includes a highest delivered packet data convergence protocol (PDCP) sequence number (SN) and information indicative of a range of data that has been successfully delivered to a terminal; and
receive at least a portion of data retransmitted from the first network element based on the feedback data,
where the information indicative of the range of data that has been successfully delivered to the terminal includes at least one highest reported new radio user plane data (NR-U) SN successfully delivered to the terminal;
determine whether all PDCP SN transmitted by the first network element are less than or equal to the highest delivered PDCP SN in the feedback data; and
determine whether all NR-U SN transmitted by the first network element are less than or equal to the highest reported NR-U SN in the feedback data, where all transmitted data is successfully delivered to the terminal based on a determination that all transmitted PDCP SN are less than or equal to the highest delivered PDCP SN and all transmitted NR-U SN are less than or equal to the highest reported NR-U SN.

11. The apparatus of claim 10, where the information indicative of the range of data that has been successfully delivered to the terminal includes a PDCP SN encapsulated within a NR-U packet data unit (PDU) associated with the NR-U SN, where the highest reported NR-U SN is less than or equal to the NR-U SN associated with the PDCP SN.

12. The apparatus of claim 10, where the information indicative of the range of data that has been successfully delivered to the terminal indicates start and end of an PDU NR-U SN set indicating whether the data in the set belongs to the feedback data to identify multiple PDCPs.

* * * * *